UNITED STATES PATENT OFFICE.

EDWIN BENNETT, OF BALTIMORE, MARYLAND, ASSIGNOR OF ONE-HALF TO THE EDWIN BENNETT POTTERY COMPANY, OF SAME PLACE.

FILTERING MEDIUM.

SPECIFICATION forming part of Letters Patent No. 583,698, dated June 1, 1897.

Application filed August 21, 1893. Serial No. 483,670. (No model.)

*To all whom it may concern:*

Be it known that I, EDWIN BENNETT, a citizen of the United States, residing at Baltimore, Maryland, have invented certain new and useful Improvements in Filtering Mediums, of which the following is a specification.

It is desirable in certain classes of filtering apparatus to make use of a filtering medium in the form of a filtering plate, block, or tube of porous material, but for many purposes where extremely perfect filtering is not required it has been found that various compositions, consisting generally of ground burnt clays and earths and silex feldspar, &c., are more or less perfect, the composition being formed into a body with water, molded by pressure or otherwise into suitable forms, and baked.

While some of the known compositions can be used in making a filtering medium capable of filtering out the deleterious germs that are in water, the use of such compositions is attended with expense and difficulty in the manufacture, and I have sought to produce a filtering medium that can be readily manufactured of any desired shape without the uncertainties, expense, and difficulties incident to the use of the composition heretofore employed.

After numerous experiments I have discovered that kaolin alone, without the mixture of any other material except the water necessary to form with it a mixture, may be used in the manufacture of a filtering medium superior, so far as I can determine, to any so far employed.

The general custom in making filters when clay or kaolin earth has been used has been to form a composition by mixing with kaolin either fine sand or ground silex or burnt clay, or kaolin ground fine. The object sought to be attained by the use of these materials has been to allow the water to pass more freely than it otherwise would do. It is very evident that fine sand and ground silex do not shrink in burning, neither does the burnt clay. Hence the water can percolate through such a medium in a less-purified condition.

When the filter is made of pure kaolin only, each particle unites with each other and the contraction is uniform, and as the burning is continued the particles become more and more compacted until the finest possible degree of filtering medium is attained, and the purest water possible is thereby obtained from its use.

The filtering articles, whether plates, tubes, or in other form, are made by mixing the kaolin without the use of other material with water and then suitably shaped in molds, and after the article is thus formed of proper shape it is placed in a kiln and subjected to a heat proportionate to the hardness to which it is desired to bake it.

Without limiting myself to the use of any special form of filtering medium, I claim—

1. As a new article of manufacture, a filtering medium consisting of baked kaolin in the form of a tube, substantially as described.

2. A filtering medium, made of pure kaolin without any admixture of burnt clay or other similar material, and burned to a suitable hardness, substantially as described.

In testimony whereof I have signed my name to this specification in the presence of two subscribing witnesses.

EDWIN BENNETT.

Witnesses:
WILBUR T. FRANCE,
GEO. E. GUNDLACH.